US010888863B2

(12) United States Patent
Ko et al.

(10) Patent No.: US 10,888,863 B2
(45) Date of Patent: Jan. 12, 2021

(54) ONE-STEP PROTEIN ANALYSIS USING SLANTED NANOFILTER ARRAY

(71) Applicant: Massachusetts Institute of Technology, Cambridge, MA (US)

(72) Inventors: Sung Hee Ko, Malden, MA (US); Jongyoon Han, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 650 days.

(21) Appl. No.: 15/512,176

(22) PCT Filed: Sep. 18, 2015

(86) PCT No.: PCT/US2015/050915
§ 371 (c)(1),
(2) Date: Mar. 17, 2017

(87) PCT Pub. No.: WO2016/044710
PCT Pub. Date: Mar. 24, 2016

(65) Prior Publication Data
US 2017/0246633 A1 Aug. 31, 2017

Related U.S. Application Data

(60) Provisional application No. 62/052,140, filed on Sep. 18, 2014, provisional application No. 62/068,314, filed on Oct. 24, 2014.

(51) Int. Cl.
*B01L 3/00* (2006.01)
*G01N 27/447* (2006.01)
*G01N 30/00* (2006.01)

(52) U.S. Cl.
CPC .. *B01L 3/502753* (2013.01); *G01N 27/44791* (2013.01); *G01N 30/0005* (2013.01);
(Continued)

(58) Field of Classification Search
CPC ......... B01L 3/502753; B01L 2400/086; B01L 2400/0415; B01L 2300/0896;
(Continued)

(56) References Cited

U.S. PATENT DOCUMENTS 6,042,709 A    3/2000  Parce et al.
6,254,754 B1 * 7/2001  Ross ................ G01N 27/44704
                                                        204/450

(Continued)

FOREIGN PATENT DOCUMENTS

WO    2007/149111 A2    12/2007
WO    WO-2007149111 A2 * 12/2007 ........... B01D 61/027

OTHER PUBLICATIONS

Fu et al. (J. Fu, P Mao, J Han, Continuous-flow bioseparation using microfabricated anisotropic nanofluidic sieving structures, Nat. Protoc. 4(11) (2009) 1681-1698). (Year: 2009).*
Cheow et al. (LF Cheow, H Bow, J Han, Continuous-flow biomolecule concentration and detection in a slanted nanofilter array, Lab Chip 12 (2012) 4441-4448) (Year: 2012).*
(Continued)

*Primary Examiner* — Maris R Kessel
*Assistant Examiner* — Joshua L Allen
(74) *Attorney, Agent, or Firm* — Elmore Patent Law Group, P.C.; Carolyn S. Elmore

(57) ABSTRACT

This disclosure provides an apparatus and a method for quickly, efficiently and continuously fractionating biomolecules, such as DNAs and proteins based on size and other factors, while allowing imaging of the separated biomolecules as they are processed within the apparatus. The apparatus employs angled nanochannels to first preconcentrate and then separate like molecules. Its embodiments offer improved detection sensitivity and separation resolution over existing technologies and multiplexing capabilities.

18 Claims, 13 Drawing Sheets

(52) U.S. Cl.
CPC .............. *B01L 2300/0877* (2013.01); *B01L 2300/0896* (2013.01); *B01L 2400/0415* (2013.01); *B01L 2400/086* (2013.01); *G01N 2030/001* (2013.01)

(58) Field of Classification Search
CPC ........ B01L 2300/0877; G01N 30/0005; G01N 27/44791; G01N 2030/001
See application file for complete search history.

(56) References Cited

U.S. PATENT DOCUMENTS

| | | | | |
|---|---|---|---|---|
| 7,150,812 | B2* | 12/2006 | Huang | G01N 27/44704 204/451 |
| 7,842,514 | B2* | 11/2010 | Hattori | B01D 29/00 436/514 |
| 7,997,831 | B2 | 8/2011 | Gilbert et al. | |
| 2011/0081674 | A1* | 4/2011 | Han | C12M 47/04 435/29 |
| 2011/0114486 | A1* | 5/2011 | Han | B01D 61/027 204/451 |

OTHER PUBLICATIONS

Fu et al. (J Fu, P Mao, A nanofilter array chip for fast gel-free biomolecule separation Appl Phys Lett. 87(26 (2005) 263902) (Year: 2005).*

Fu et al. (J Fu, P Mao, J Han, Artificial molecular sieves and filters: a new paradigm for biomolecule separation, Trends in Biotechnology 26(6) (2008) 311-320) (Year: 2008).*

Fu et al. (J Fu, J Yoo, J Han, Molecular sieving in periodic free-energy landscapes created by patterned nanofilter arrays, Phys Rev Lett 97(1) (2006) 018103) (Year: 2006).*

Fu et al. (J Fu, RB Schoch, AL Stevens, SR Tannenbaum, J Han, A patterned anisotropic nanofluidic sieving structure for continuous-flow separation of DNA and proteins, Nat. Nanotech 2 (2007) 121-128) (Year: 2007).*

Han et al. (J Han, HG Craighead, Separation of long DNA molecules in microfabricated entropic trap array, Science 288 (2000) 1026-1029) (Year: 2000).*

Yamada et al. (M Yamada, P Mao, J Fu, J Han, Rapid Quantification of Disease-Marker Proteins Using Continuous-Flow Immunoseparation in a Nanosieve Fluidic Device, Anal. Chem. 81 (2009) 7067-7074) (Year: 2009).*

* cited by examiner

ONE-STEP PROTEIN ANALYSIS USING SLANTED NANOFILTER ARRAY

GOVERNMENT SUPPORT

This invention was made with government support under Contract No. N66001-13-C-4025 awarded by the Space and Naval Warfare Systems Center. The government has certain rights in the invention.

RELATED APPLICATION

This application is related to U.S. Provisional Application Nos. 62/052,140 and 62/068,314, filed on Sep. 18, 2014 and Oct. 24, 2014 respectively. The entire teachings of the above applications are incorporated herein by reference.

FIELD OF THE INVENTION

This invention is directed to protein sorting biomolecular sorters comprising slanted nanofilter arrays, and methods of use thereof.

BACKGROUND OF THE INVENTION

Size-based separation of proteins using technologies such as Size Exclusion Chromatography (SEC) and SDS-PAGE is widely employed to check the purity of protein drugs in pharmaceutical manufacturing processes. These technologies also serve to detect toxic impurities such as protein aggregates in processed samples. Although still in use, SEC has as drawbacks, low separation resolution, low sensitivity and lowered accuracy due to adsorption of sample molecules to polymeric sieving matrices. In addition, a limited number of bands can be accommodated because the time scale of the chromatography is short. Gel electrophoresis was developed as an alternative to SEC. Gel electrophoresis provided higher separation resolution and required smaller amounts of loading sample as compared to SEC. While liquid gel electrophoresis has been automated in a microfluidic platform, this technique still requires polymeric sieving matrices that can increase technical complexity in both manufacture and use, preventing implementation of truly portable, on-site drug purity and efficacy tests. Notably, existing embodiments of the above technologies (including those comprising a microfluidic platform) are batch-process oriented. Thus, they do not lend themselves to continuous throughput and therefore continuous monitoring during a manufacturing process. The use of Asymmetric Nanofilter Arrays (ANA) has been previously disclosed [1]. However, the detection sensitivity of embodiments of that disclosure is low due to short optical path lengths. In addition, a number of electrical connections and a voltage controller are required, thereby introducing complexity into manufacture and use, and negatively impacting the portability of the device. Another problem area in existing protein sorting devices relates to the detection limit of low-abundance background molecules due to the concentration levels and degree of separation of the various molecules achieved during processing. This may be further limited by the level enabled by fluorescence and detection instruments.

SUMMARY OF THE INVENTION

Here we disclose a biomolecular sorter, nanofluidic chip comprising at least one biomolecular sorter and multiplexing embodiments thereof for protein analysis which overcomes the previously discussed limitations of existing technologies. First, slanted nanofilter arrays comprising periodically-patterned deep and shallow nanochannels, or nanoslits, are used to achieve protein preconcentration and size-based protein separation in a single biomolecular sorter while utilizing a one-step process. Second, we present a biomolecular sorter that has high separation resolution and high detection sensitivity compared to existing technologies for commercialization.

Our invention involves the following specific innovations:

(1) We have developed a novel nanofluidic biomolecular sorter that allows rapid (~30 mins.) protein preconcentration and size-based protein separation in a single biomolecular sorter and one-step process. Protein analysis is achieved continuously, so that this technology is suited for continuous monitoring (real-time release). Since all samples are focused (or preconcentrated) toward one side of the biomolecular sorter wall before protein separation, it is not necessary to make launching bands, which are typically used in gel electrophoresis and also one of the important parameters in determining separation resolution. The biomolecular sorter consists of slanted nanofilter arrays with periodically-patterned deep and shallow nanoslits instead of gel, providing the benefits of: small sample volume; highly reproducible results with little expertise required; simple preparation versus gel or column preparation step; general buffer solution (Tris, e.g.); all in a robust and reusable biomolecular sorter.

(2) We have developed the strategies to improve both protein separation resolution and detection sensitivity of the invented technology for commercialization. We have designed different biomolecular sorters with multi-dimension nanochannels, such as parallel type and series type, for high separation resolution, which makes it possible to separate a normal protein ladder like gel electrophoresis. In addition, we have designed a second preconcentration (focusing) region to enhance reduced signal intensity by diffusion in the downstream of the separation region, which is quite useful to achieve low limit of detection and to detect less abundant molecules, such as impurities (aggregated proteins, protein fragment, e.g.).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
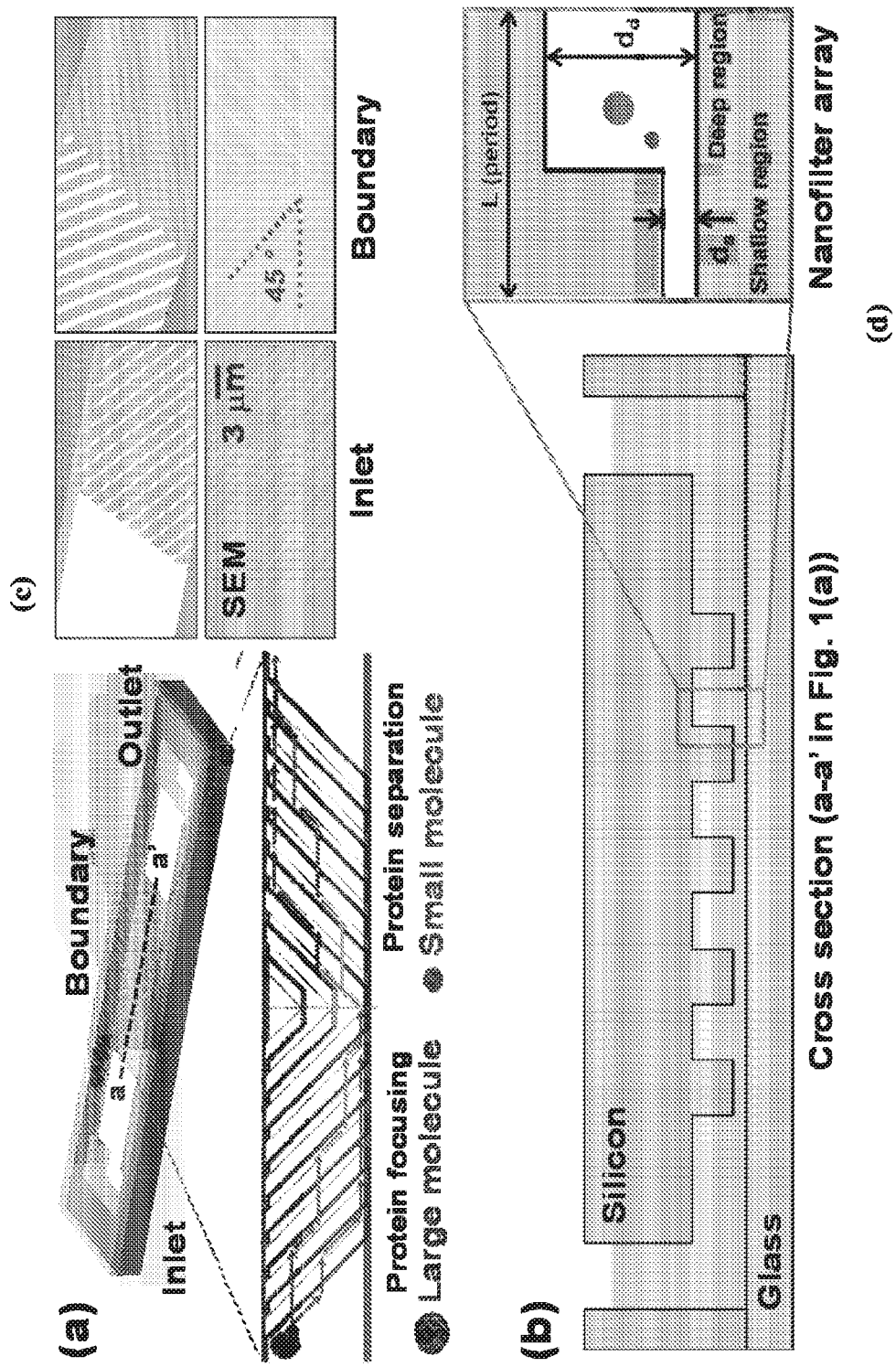
FIG. 1 $a$) Schematics and SEM images of continuous-flow preconcentration and separation biomolecular sorter, and the principle of proteins preconcentration (focusing) and separation based on size in the slanted nanochannel arrays biomolecular sorter. $b$) Biomolecular sorter cross-section (a-a') and sieving mechanism within the nanochannel. $c$) Detail view of angled nanochannels and transition from preconcentration zone to separation zone. $d$) Detail of shallow and deep regions within the nanofilter array.

FIG. 1(a) shows schematics of a continuous-flow protein preconcentration and separation biomolecular sorter with slanted nanofilter arrays. The biomolecular sorter has one-inlet, one-outlet and slanted nanochannel arrays with two different depths; shallow region ($d_s$) and deep region ($d_d$), as shown in FIG. 1(b). For single step analysis, the nanofilter formed by the deep regions (used as sieving matrix) are angled with respect to the main channel and field direction, driving molecules toward the edge of the channel [2]. The biomolecular sorter consists of two regions (preconcentration and separation regions), each with dissimilar angles (in the example shown in FIG. 1, 135° for preconcentration region and 45° for separation region). A protein mixture is directly loaded from the inlet reservoir continuously with a single voltage applied. After the loaded mixture proteins are mechanically focused toward the bottom edge of the channel wall in the preconcentration region by slanted nanochannels [2], they are then size-separated in the separation region (FIG. 1(a)). In this biomolecular sorter, there is no need to create 'launching bands' which is an essential step in discontinuous gel electrophoresis. The sieving mechanism is Ogston sieving (molecule size<shallow nanochannel depth) in which smaller molecules have less configurational entropic energy barrier by steric (or electrostatic) hindrance, resulting in greater jump passage probability and therefore low deflection angle. Hence, different size molecules have distinct trajectories (deflection angle: large molecule>small molecule in FIG. 1(a)).

The biomolecular sorter can be fabricated by standard MEMS fabrication process, not requiring relatively expensive nanolithography techniques. Nanochannel arrays with two different depths can be made on silicon wafer by photolithography and dry etching method (e.g., reactive ion etching). By etching nanochannels on the surface of a first wafer, or substrate, while leaving the surface of a second wafer, or substrate, contiguous, deep and shallow nanochannels are conveniently formed when the two wafers are bonded together, leaving a contiguous boundary layer the desired depth of the shallow nanochannel between the two wafers. The total depth of the deep nanochannels is the sum of the depth of the etching on the surface of the first wafer and the depth of the contiguous boundary. It will be clear, however, that a nanochannel array having nanochannels of two different depths can be designed with alternative configurations (e.g., etching both wafers. Preferably, the deep and shallow nanochannels are in fluid communication along substantially the entire length of the nanochannels, more preferably along the entire length of the nanochannels.

Figure 2:
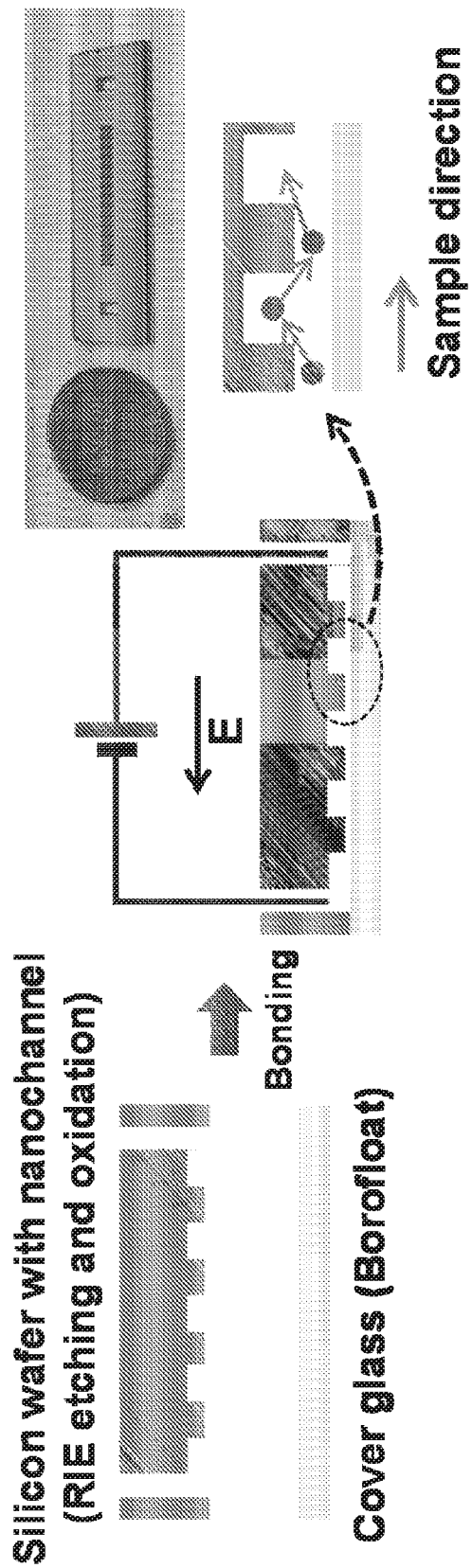
FIG. 2 Schematic of the biomolecular sorter fabrication, sample behavior in nanofilter array under DC electric field and a photo of silicon-glass preconcentration/separation biomolecular sorter.

Reservoirs for loading the sample and connecting electrical potential can be made by KOH etching, followed by deposition of oxide layer on silicon surface to provide an electrical insulation between silicon surface and buffer solution. The front surface with nanochannel arrays can be covered by the second wafer (e.g., a Borofloat wafer), and the two wafers can be bonded in an anodic bonding machine. To enhance bonding strength between two wafers, additional annealing process can be done in a furnace. (FIG. 2).

To demonstrate continuous-flow size-base protein preconcentration and separation, we used four proteins, such as BSA (66 kDa), Ovalbumin (45 kDa), Trypsin inhibitor (21 kDa) and cholera toxin subunit B (11.4 kDa) (Invitrogen, N.Y., USA). All protein samples used were labeled by Alexa fluor dye with two different emission wavelengths, and denatured by heat (80° C.) and SDS surfactant. To prevent non-specific adhesion of proteins to the silicon-glass surface, the nanochannel arrays were coated by POP 6™ Polymer-CG 3130 Series (Invitrogen, N.Y., USA) by electroosmotic flow before loading protein samples. Buffer solution is 10×TBE with 0.05% SDS molecule. The detailed fabrication process and operating procedure including biomolecular sorter preparation, sample loading, biomolecular sorter cleaning and storage are described in the previous publication [3].

To verify protein separation, we performed protein separation using standard protein ladder in the proposed biomolecular sorter with various nanochannel depths. To quantify separation resolution, we measured not only fluorescence intensity profile (FIG. 3), but also deflection angle of each protein with different nanochannel depth (FIG. 4). The large angle difference between protein streamlines resulted in better separation resolution, because gap distance between streamlines increased more in the downstream of the separation region.

While three proteins were separated in a 30 nm shallow region (FIG. 3(a)), four protein separation was observed in the biomolecular sorter with 20 nm (shallow region), as shown in FIG. 3(b). From these results, we confirmed that when the shallow region depth decreases, separation resolution is improved, because smaller filter size resulted in a higher entropic barrier. Separation resolution also increased with deep region depth. In FIG. 4, 300 nm deep region had larger angle difference in 40 nm and 60 nm shallow region than a 100 nm deep region. However, in 20 nm and 30 nm shallow region, separation resolution (angle difference) is independent of deep region depth (20 nm results not shown). The best size selectivity for a given shallow region may occur in $K_d\sim 1$ and $K\sim K_s$ ($K=K_s/K_d$: ratio of the partition coefficient, $K_d$: deep region partition coefficient, $K_s$: shallow region partition coefficient). The biomolecular sorter with 300 nm deep region may have a higher selectivity than 100 nm deep region due to the large $K_d$ (0.992) in 300 nm deep region, compared to $K_d$ (0.975) in 100 nm deep region [4]. We conjecture that the change of ratio of partition coefficient (K) is small in a very thin shallow region according to change of deep region depth. In addition to depth effect, the protein separation resolution may be further improved by modifying the nanofilter angle, nanofilter period, buffer ionic strength, biomolecular sorter width and length, etc.

Figure 5:
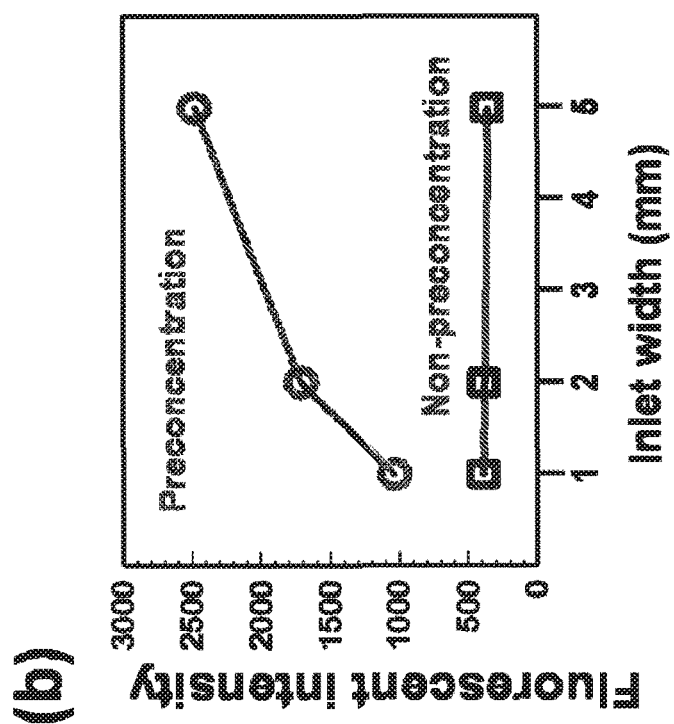
FIG. 5 a) Quantification of LOD (limit of detection) and preconcentration factor with different protein concentrations (0.08 µg/mL~50 µg/mL; b) different inlet width (1 mm~5 mm, (b)).
Figure 5:
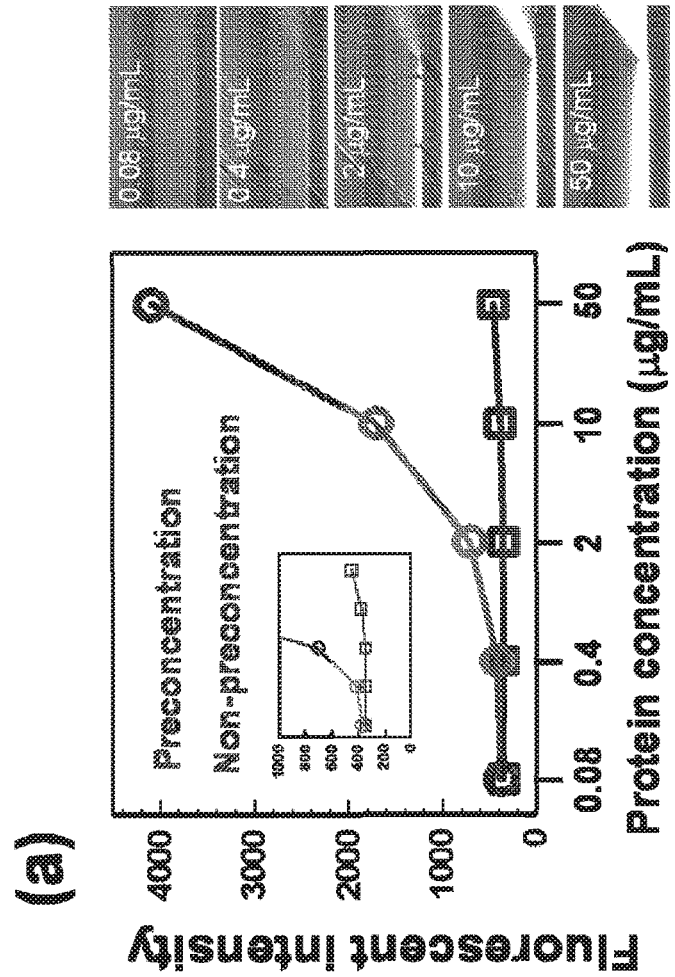

One key innovation is the integrated preconcentration region, which not only defines the 'launching band' for protein separation but also carries out significant preconcentration to improve the overall detection sensitivity, even in a thin nanofluidic channel (~100 nm). To check enhancement of detection sensitivity, we measured limit of detection (LOD) and preconcentration factor with different concentrations of proteins (BSA, red box in FIG. 5) and varying inlet channel widths. FIG. 5(a) shows that ~100-fold increase in LOD (80 ng/mL) and preconcentration factor was achieved. This is higher detection sensitivity than the silver staining method (~20 ng of protein required per ~10 μL loading volume), yet LOD and preconcentration factor could be further enhanced simply by increasing the width and collecting more molecules in the preconcentration stage (FIG. 5(b)).

Figure 3:
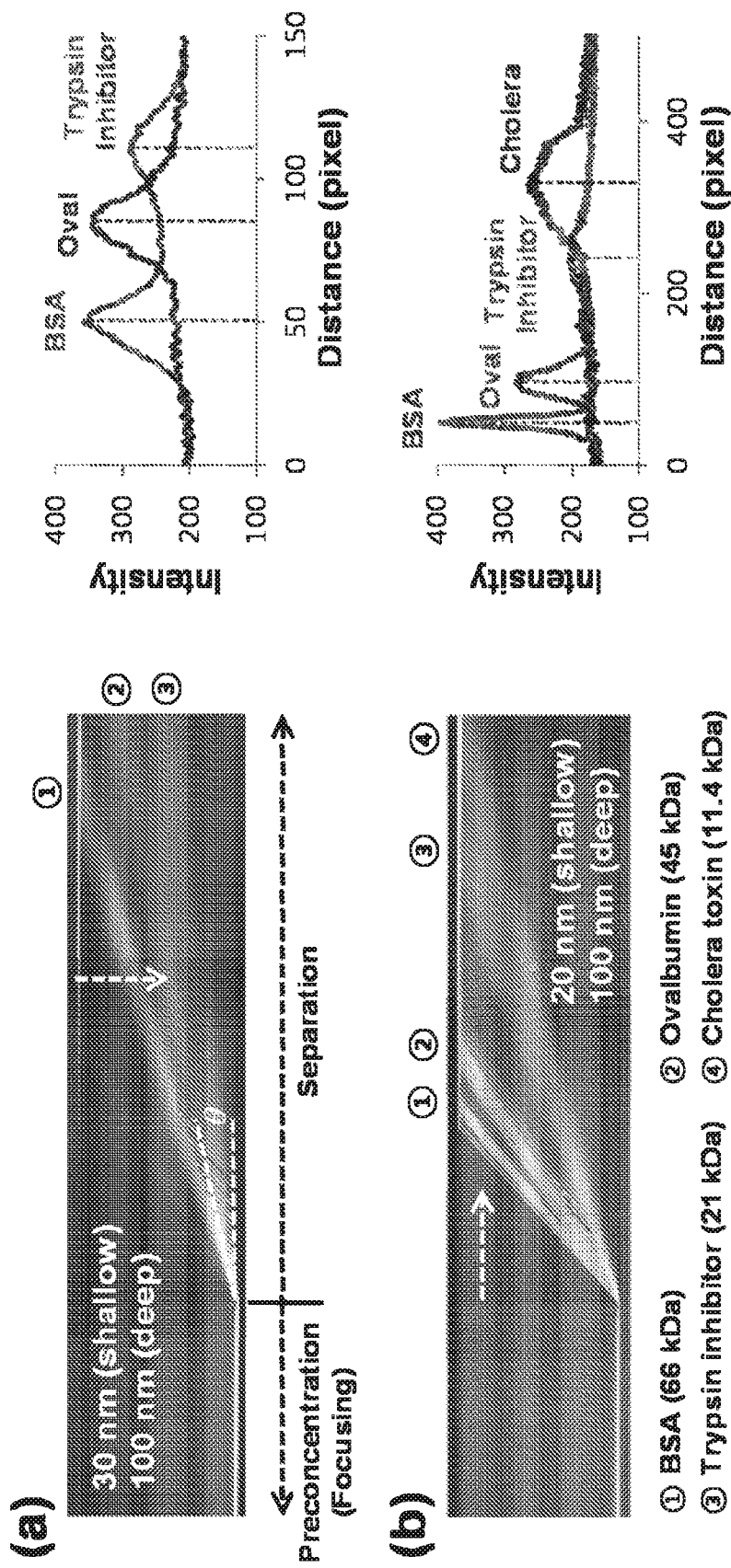
FIG. 3 Demonstration of proteins separation in separation region. The protein concentrations used are 50 µg/mL (BSA), 100 µg/mL (Ovalbumin), 100 µg/mL (Trypsin inhibitor) and 100 µg/mL (Chorela Toxin subunit B): a) 30 nm shallow region and 100 nm deep region; b) 20 nm shallow region and 100 nm deep region.
Figure 4:
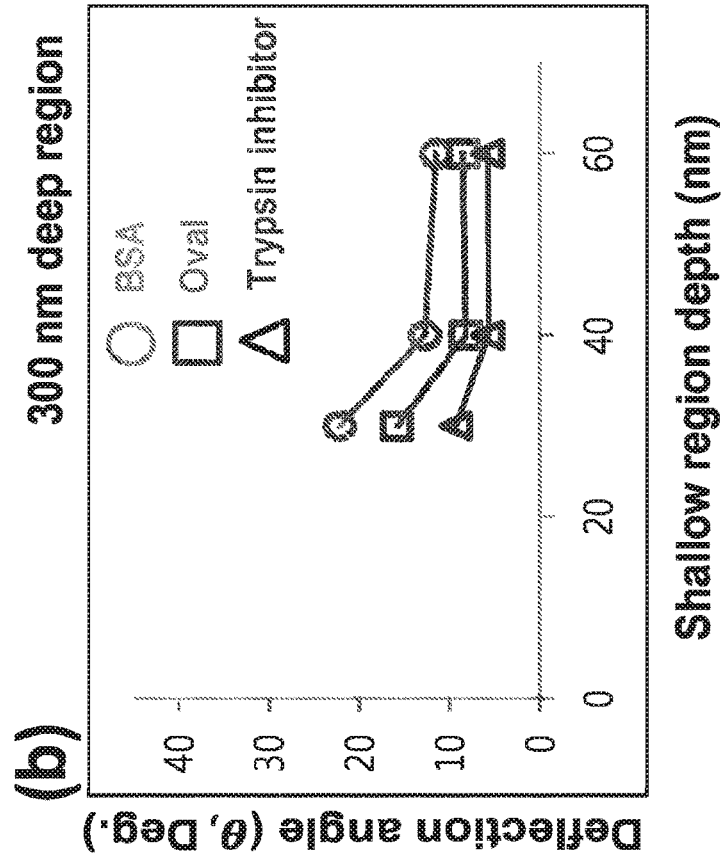
FIG. 4 Deflection angle of three proteins (BSA, Ovalbumin and Trypsin inhibitor) depending on shallow region depth (20 nm~60 nm): a) 100 nm deep region; b) 300 nm deep region.
Figure 4:
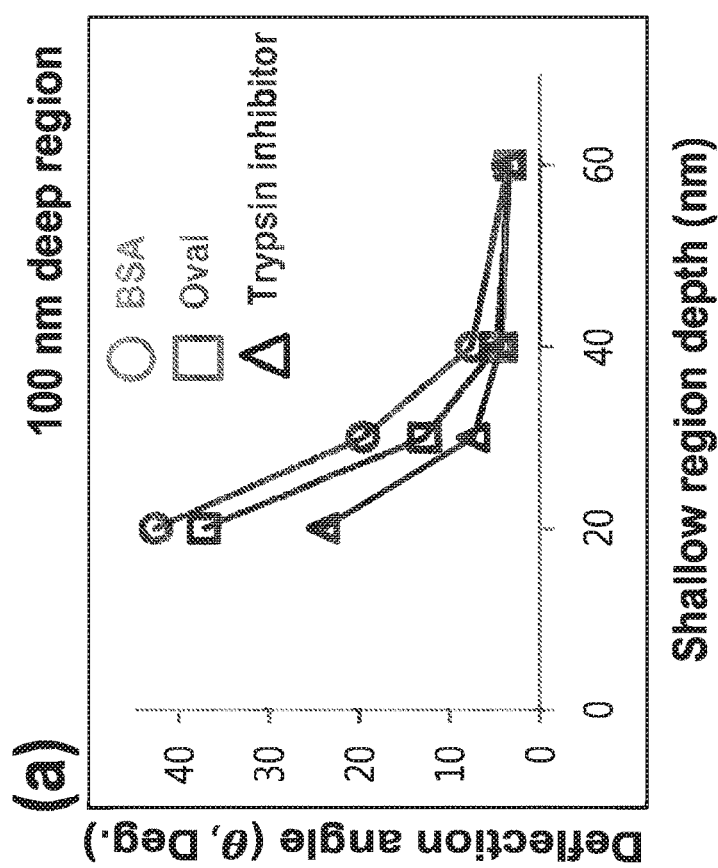
Figure 6:
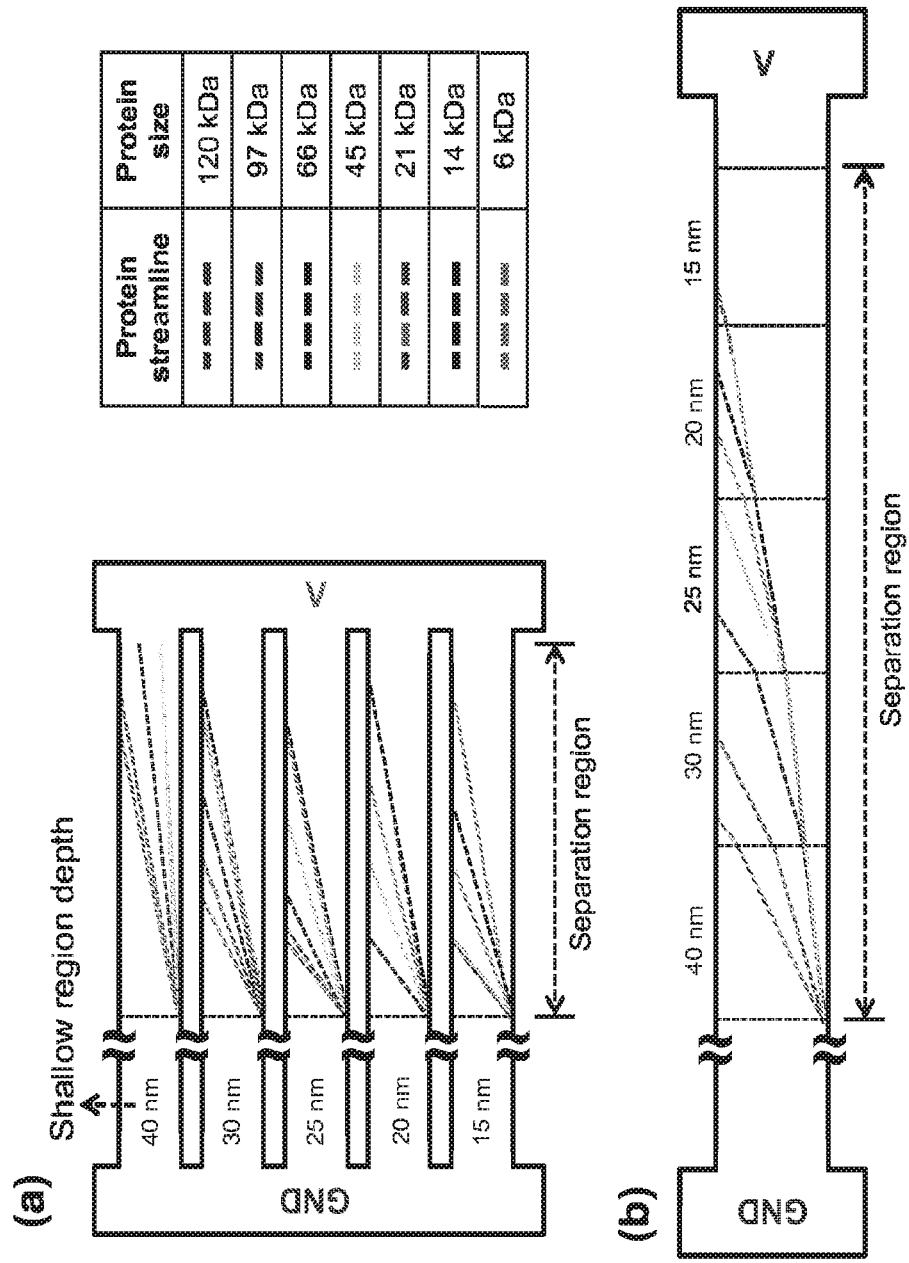
FIG. 6 Schematic of separation region with multi-dimension nanochannel composed of 5 regions. Protein ladder size range is from 6 kDa to 120 kDa. a) parallel type, b) series type.

In FIG. 3, multiple protein separation was performed in the slanted nanochannel biomolecular sorter with different shallow region depth. Even though two proteins, such as 21 kDa and 11.4 kDa, are separated in the 20 nm shallow region biomolecular sorter, the separation resolution between BSA (66 kDa) and Ovalbumin (45 kDa) is less than in the 30 nm shallow region biomolecular sorter. The change of deflection angle of Ovalbumin from 30 nm to 20 nm shallow region is larger than that of BSA, because the BSA deflection angle is saturated (nanochannel angle is 45° in this example). This means that proteins larger than BSA (66 kDa) are not separated in 20 nm shallow region. In 30 nm shallow region, however, since BSA deflection angle is not saturated yet, it is possible for proteins larger than BSA to have a larger deflection angle, which means proteins over BSA can be separated from BSA. Based on these experiment results, we can design new protein concentration/separation biomolecular sorter with multi-dimension nanochannel. There are two different types, such as parallel and series type, as shown in FIG. 6. In the parallel type (FIG. 6(a)), all unit biomolecular sorters with different shallow region dimensions are connected to same inlet and outlet, which makes the number of electrical connection to be independent of the number of unit biomolecular sorters. In upper channel with 40 nm, large-range proteins can be separated, and small-range proteins can be separated in lower channel with 15 nm. In series type (FIG. 6(b)), the biomolecular sorter is divided into several separation regions with different shallow region depth. In first separation region (40 nm), largest proteins can be separated from protein mixtures first. And then, other proteins can be separated one after another in each separation region from large to small size because hindrance effect increases with going downstream of the separation region due to smaller shallow region. Finally, smallest protein is separated in last separation region. The series type separation biomolecular sorter is quite similar to gradient-gel electrophoresis. In both parallel and series type biomolecular sorters, deep region depth could also affect protein separation resolution (not drawn in schematics). We expect that it is possible for both parallel and series type biomolecular sorters to have similar separation resolution compared to SDS-PAGE, so that the proposed design could replace general gel-electrophoresis method for biomolecule separation in the future.

Figure 7:
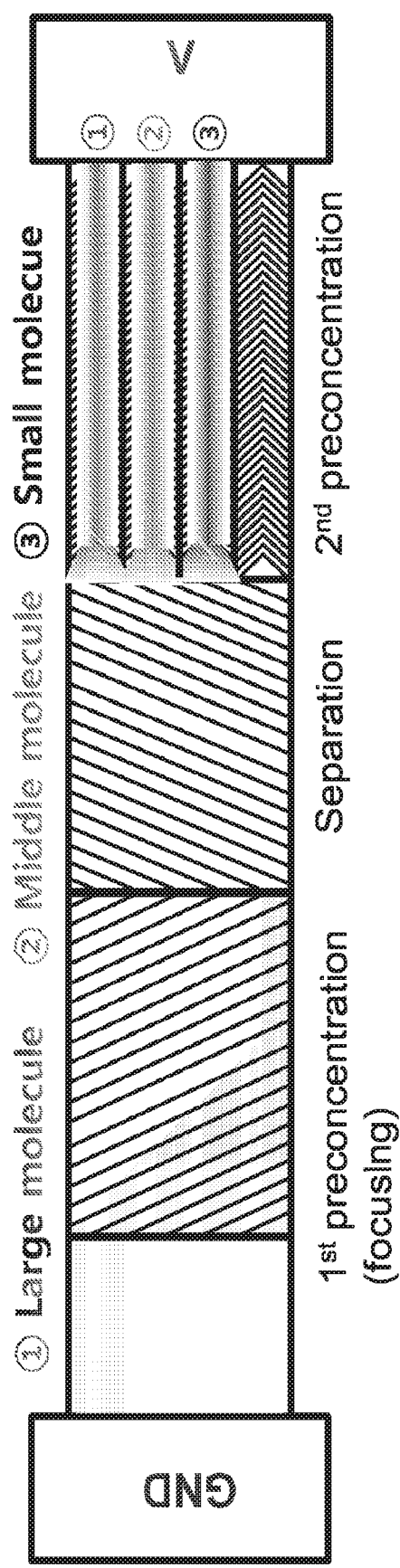
FIG. 7 Schematic of second preconcentration (focusing) region in the downstream of the separation region. After separation region, each streamline comes into $2^{nd}$ preconcentration region and is focused again.
Figure 8:
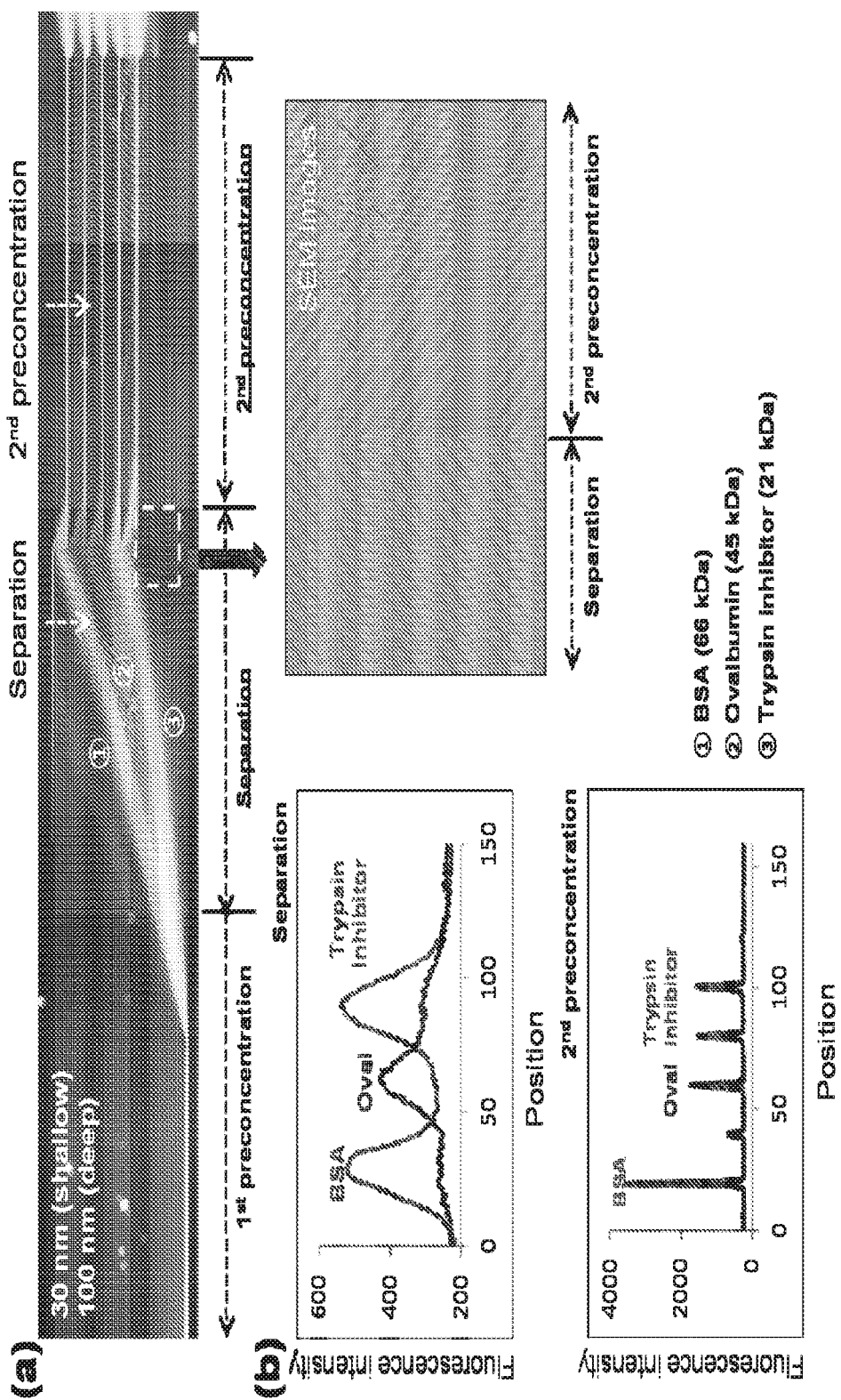
FIG. 8 a) Demonstration of proteins separation in separation region and SEM image around boundary between separation region and $2^{nd}$ preconcentration region, the protein concentrations used are 50 µg/mL (BSA), 100 µg/mL (Ovalbumin), and 100 µg/mL (Trypsin inhibitor); b) Fluorescence profiles in both separation region and $2^{nd}$ preconcentration region are measured along white dot line.

While previously developed nanochannel-based biomolecule separation biomolecular sorters have several merits, there is a significant problem in that detection sensitivity of nanochannel biomolecular sorters is low because of short optical path lengths. In addition, protein streamlines diffuse in the downstream of the separation region, leading to poor detection sensitivity even though sample molecules are focused. To resolve the problem, we propose additional sample focusing region, so called second preconcentration. FIG. 7 shows schematic of the biomolecular sorter integrated with $2^{nd}$ preconcentration region. After protein separation, when each streamline comes into $2^{nd}$ preconcentration region with herringbone structure or slanted structure like $1^{st}$ preconcentration region and separation region, diffused protein streamlines are focused again, which can enhance significant detection sensitivity.

A preferred embodiment of the disclosure is a biomolecular sorter comprising:
   a) a first substrate;
   b) a second substrate, preferably an optical glass, affixed to a surface of the first substrate;
   c) at least one sample inlet on a surface of the first substrate;
   d) at least one sample outlet on a surface of the first substrate;
   e) at least a first preconcentration region on a surface of the first substrate, the at least first preconcentration region comprising a plurality of first nanochannels having a shallow depth and a plurality of second nanochannels having a deep depth, and said plurality of first and plurality of second nanochannels are in fluid communication with each other and the at least one sample inlet;

f) at least a first separation region on a surface of the substrate, the at least a first separation region comprising a plurality of first nanochannels having a shallow depth and a plurality of second nanochannels having a deep depth, and said plurality of first and plurality of second nanochannels are in fluid communication with each other, the at least a first preconcentration region and the at least one sample outlet;

g) at least a first conduit for applying an electrostatic force field or hydrodynamic force field to the nanochannels of the at least a first preconcentration region and the nanochannels of the at least a first separation region;

h) at least a second conduit for applying an electrostatic force field or hydrodynamic force field to the nanochannels of the at least a first separation region and the nanochannels of the at least a first preconcentration region.

The biomolecular sorter can be used to sort a plurality of distinct biomolecules within a sample, such as an aqueous sample. The biomolecules within the sample can be characterized by different sizes, molecular weights, hydrophobicity, and/or charge.

"Shallow depth" is defined to mean a depth that permits transport of at least one biomolecule in the direction of an applied force field, (e.g., a hydrodynamic or electrostatic force field) within the sample but prevents, impedes or slows the transport of at least one distinct biomolecule within the sample. Examples of suitable shallow depths can range from 5 nm to 100 nm, preferably between 10-50 nm, such as 20-30 nm. "Deep depth" is defined to mean a depth that is greater than the shallow depth, such as at least 2, preferably between 1.5 and 100 times the shallow depth, more preferably between 1.5 and 20 times the shallow depth. Preferably the deep depth is sufficient to permit unimpeded transport of the largest biomolecules in the sample along the length of the nanochannel(s).

The depths of the nanochannels of the at least a first preconcentration region and the nanochannels of the at least a first separation region are typically between about 15 nm and 300 nm. The said nanochannels of the at least a first preconcentration region are angled at between about 115 degrees and 155 degrees relative to the electrostatic or hydrodynamic force fields of the at least a first conduit and the at least a second conduit so as to cause concentration of specific molecule species within the at least a first preconcentration region. The said channels of the at least first separation region are angled at between about 15 degrees and 75 degrees, preferably 25 degrees and 75 degrees, relative to the electrostatic or hydrodynamic force fields of the at least a first conduit and the at least a second conduit so as to cause separation of specific molecule species within the at least first separation region. Preferably, an unbroken plane exists between a surface of the second substrate and a surface of the first substrate such that the unbroken plane is in fluid communication with the nanochannels of the at least a first preconcentration region and the nanochannels of the at least a first separation region. Preferably, the depth of each nanochannel in the at least a first concentration region and/or the at least a first separation region can be the same or different, or constant, or variable along its length.

In embodiments, the surfaces of the substrates and nanochannels are coated to prevent adhesion of the biomolecules, as generally known in the art.

In another preferred embodiment, either or both of the at least one sample inlet or the at least one sample outlet of the biomolecular sorter is in fluid communication with or comprises a reservoir.

Yet another preferred embodiment would comprise microfluidic channels in fluid communication with the nanochannels of the at least a first concentration region. Said microfluidic channels would preferably comprise sample loading ports.

Another preferred embodiment would comprise microfluidic channels in fluid communication with the nanochannels of the at least a first separation region. Said microfluidic channels would preferably comprise sample collection ports.

In yet another preferred embodiment, the electrostatic force field or hydrodynamic force field is applied in either pulse-field operation mode or in continuous-field operation mode.

In still another preferred embodiment, the substrate of the biomolecular sorter comprises silicon or glass.

Another preferred embodiment includes a microchip comprising the described biomolecular sorter.

Figure 9:
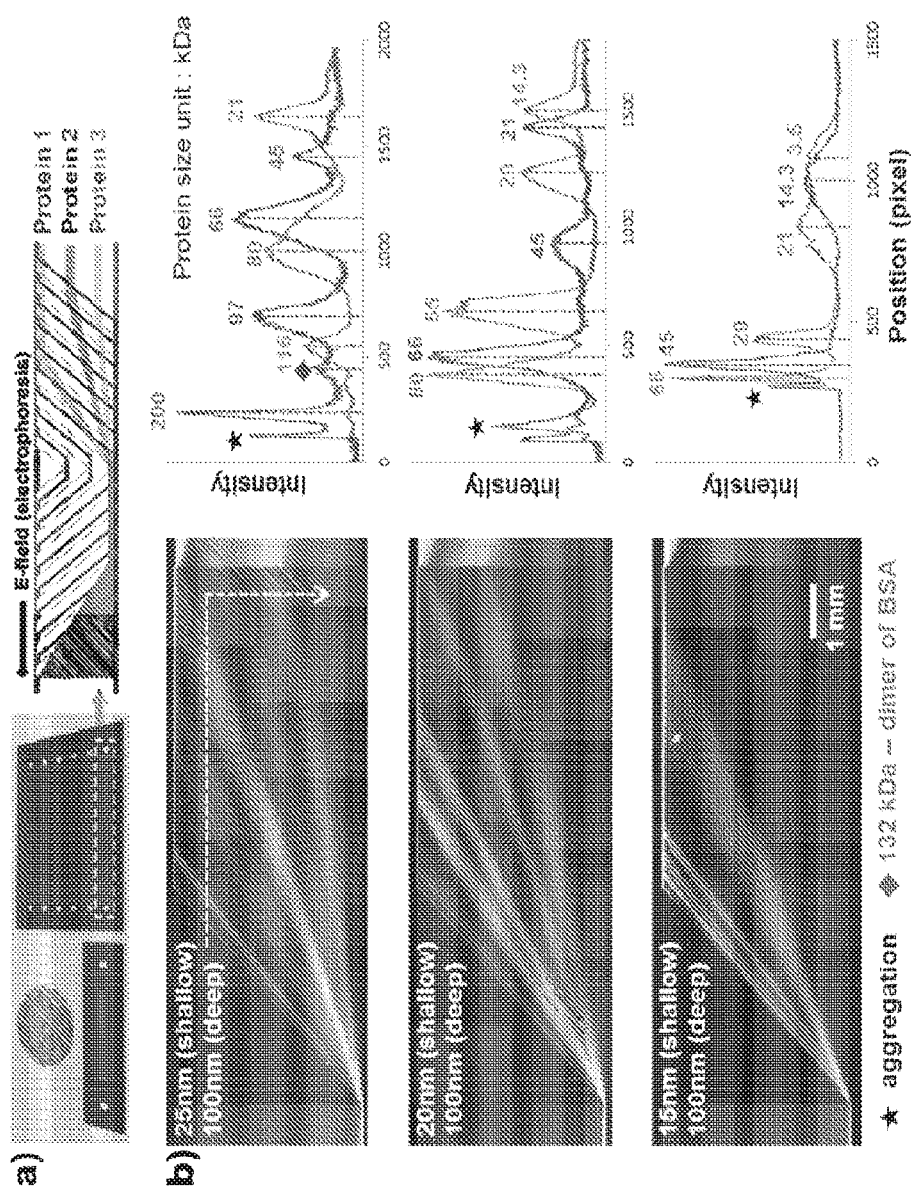
FIG. 9 a) Schematic and biomolecular sorter image of parallel type multiplexing embodiment (size: protein 1>protein 2>protein 3); (b) Demonstration of proteins separation in separation region. The protein size range is from 3.5 kDa to 200 kDa, and each protein concentrations are 50 µg/mL. To distinguish adjacent proteins easily, two fluorescent dyes with different wavelengths were used, and then fluorescence profiles were measured along white dotted line.

Multiplexing embodiments are considered as shown in FIG. 9. A preferred embodiment comprises at least first and second biomolecular sorters, each differing in configurations of channel depths and widths. As shown, the embodiment consists of 6 individual biomolecular sorters channels, and various nanofilter dimensions and configurations, such as nanochannel depth/width, pattern period and angle, can be established in each separation channel. Testing of various embodiments is described below:

Protein Ladder Separation

To verify separation efficiency of the proposed biomolecular sorter, we performed protein size separation using fluorescence labeled protein ladder in the size range of 3.5 kDa to 200 kDa, as shown in FIG. 9(b). We tested three different biomolecular sorter designs (biomolecular sorters with 25 nm, 20 nm and 15 nm shallow region, each with a 100 nm deep region and a 4 min wide channel), because the protein size and shallow region depth correlate overall separation efficiency like gel electrophoresis (large nanochannel/pore size for large protein separation, and small nanochannel/pore size for small protein separation). Each nanofluidic separator tested here could separate proteins in a defined range: proteins with MWs of 21 kDa, 45 kDa, 66 kDa, 80 kDa, 97 kDa, 116 kDa, 132 kDa and 200 kDa could be separated in the 25 nm shallow region biomolecular sorter; proteins with MWs of 14.3 kDa, 21 kDa, 29 kDa, 45 kDa, 55 kDa, 66 kDa and 80 kDa could be separated in the 20 nm shallow region biomolecular sorter; and proteins with MWs of 3.5 kDa, 14 kDa, 21 kDa 29 kDa, 45 kDa and 66 kDa could be separated in the 15 nm shallow region biomolecular sorter. Additionally, a width of each channel increases from 2 mm to 4 mm. The wider channel has two advantages. One thing is that since more proteins are focused (or concentrated) in the concentration region, the detection sensitivity can be enhanced. The other thing is that the separation resolution in the wide channel is better than in narrow channel even if the cause is not determined yet.

Native Protein Separation

Figure 10:
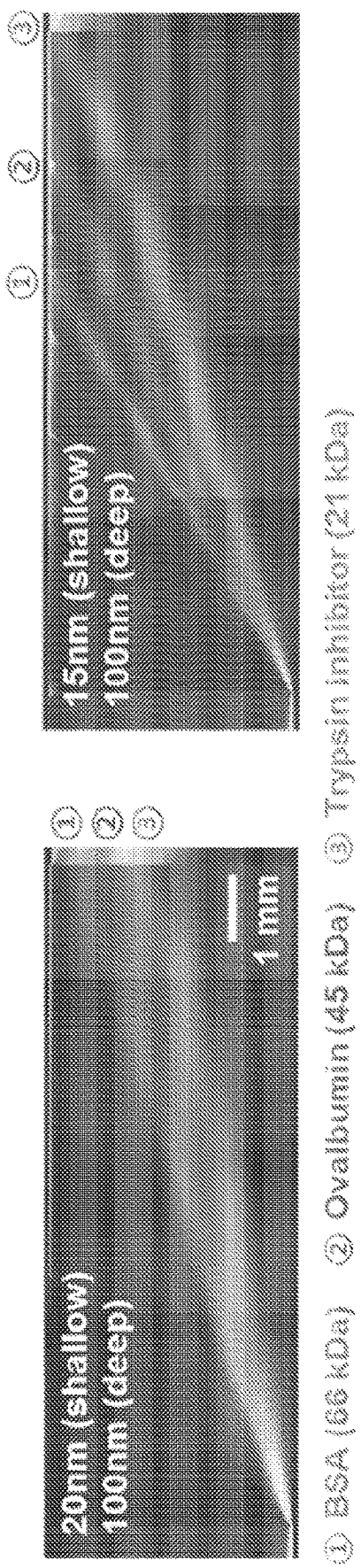
FIG. 10 Native protein separation in the same biomolecular sorter used for SDS-protein separation. Each protein concentration is 50 µg/mL.

In addition to SDS-denatured protein separation, the gel electrophoresis can be used for native protein separation. FIG. 10 shows demonstrations of native protein separation with different sizes, such as 21 kDa, 45 kDa and 66 kDa. This separation was performed in the same biomolecular sorters used in SDS-denatured protein separation, and buffer solution did not include SDS molecules. In the case of native protein separation, the separation resolution is less than the case of SDS-protein separation like gel electrophoresis due to low surface charge and folding state, leading to small steric/electrostatic interaction with nanofilter and low electrophoretic mobility (inducing high diffusion) in the same biomolecular sorter condition, compared to SDS-protein separation. While SDS-proteins were clearly separated according to their molecular weights in all nanofilter dimensions, such as 25 nm, 20 nm and 15 nm, the native proteins were separated in only 15 nm shallow region biomolecular sorter. Even if the resolution is less, we confirmed the native protein separation was performed successfully in the biomolecular sorter.

DNA Separation

Figure 11:
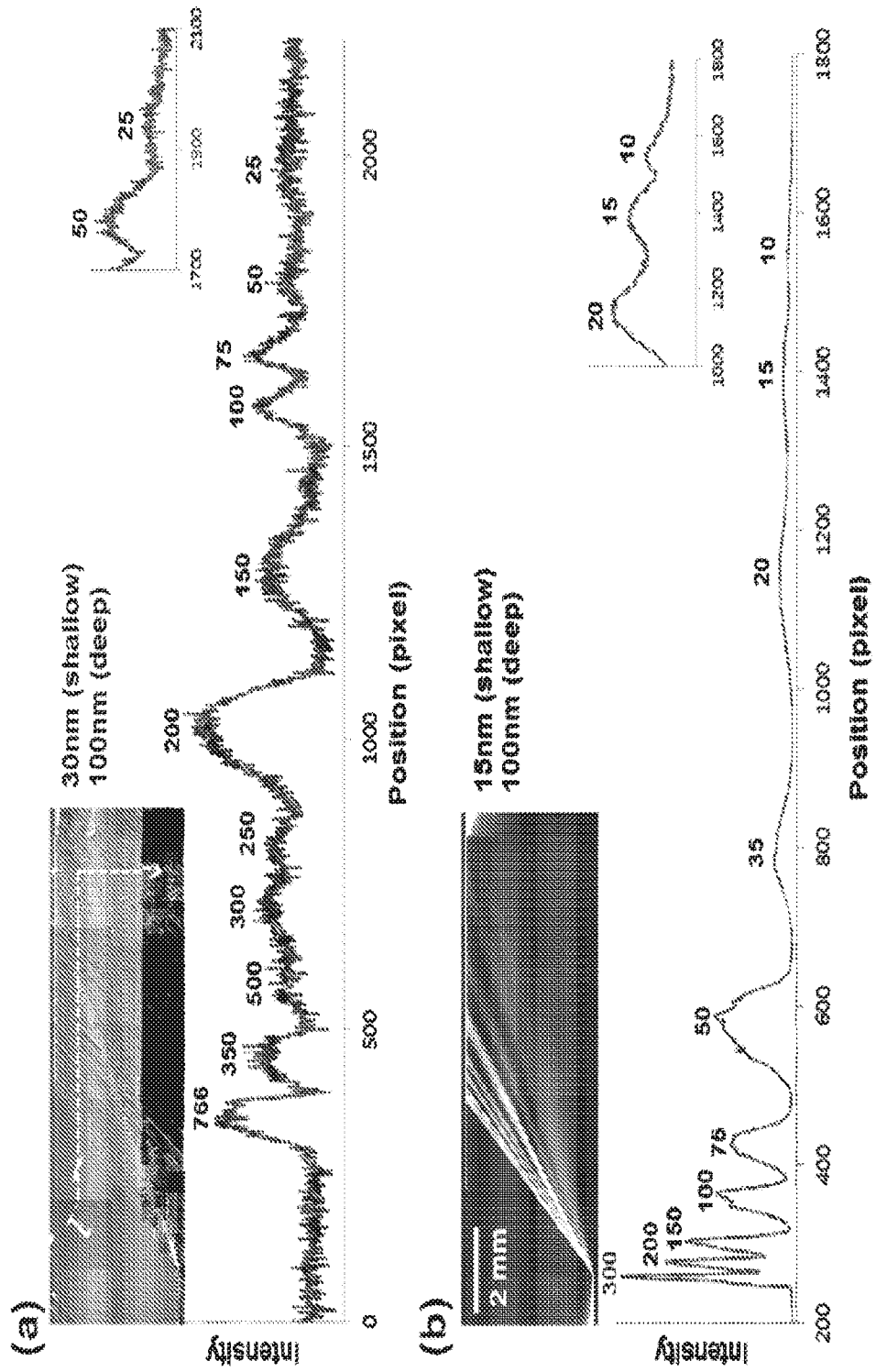
FIG. 11 DNA ladder separation. All DNA ladders were labeled by YOYO-1 dye at a dye/base pair ratio of 1:10. (a) The ladder concentration is 100 µg/mL (b) The ladder concentration is 75 µg/mL.

The mechanism of the nanofluidic separation biomolecular sorter is related to Ogston sieving theory, which involves molecular transport through nanofilter constrictions whose dimension is greater than the molecular size. Based on this theory, small biomolecules jump across the nanofilter shallow region with higher probability, leading to faster migration speed or higher mobility through the whole nanofilter array than large molecules, due to lower configurational entropic barrier. In this system, molecules deflection angle with different size is determined by interaction between tilted nanofilter array and Ogston sieving mechanism. This means that any molecules with smaller size than nanofilter dimension can be separated in the same mechanism, such as rod-like DNA, RNA and peptides. To verify the biomolecular sorter being applicable to separating various types of molecules, DNA separation was performed in the same biomolecular sorter. The DNA used here is rod-like DNA, which means that the behavior in nanofilter array is similar to SDS-denatured proteins. We used two different size-range DNA ladder to show correlation between DNA size and nanofilter dimension, as show in FIGS. 11(a) and 11(b). Different size DNA has different separation resolution in the same manner as the protein separation. Especially, in the 15 nm shallow region biomolecular sorter, DNA with 5 bp interval was separated successfully. Additionally, DNA larger than the shallow region nanofilter size can be separated based on the size by a different sieving mechanism, such as entropic trapping.

Biologics Purity Test (Size-Based Separation)

Figure 12:
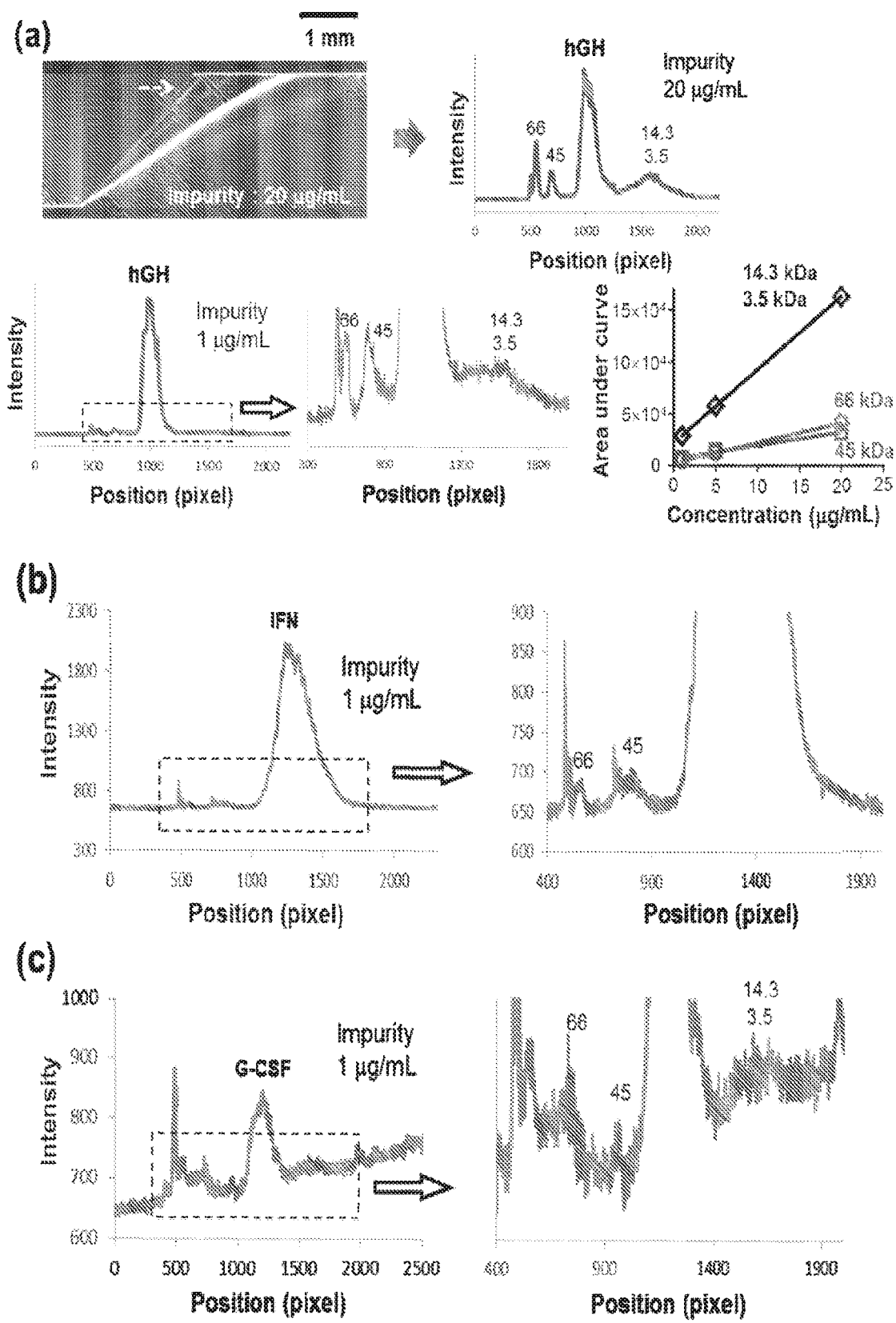
FIG. 12 Demonstration of three biologics' purity test spiked with protein ladder as simulated impurities (66 kDa, 45 kDa, 14.3 kDa and 3.5 kDa); (a) recombinant human Growth Hormone (rhGH); (b) Interferon-alpha-2b (IFN), (c) Granulocyte colony-stimulating factor (G-CSF). Target protein concentration is 100 µg/mL.

Based on protein ladder separation, our group performed biologics purity test using nanofluidic separation biomolecular sorter, as shown in FIG. 12. We then used the 20 nm shallow region biomolecular sorter in a proof of concept demonstration to detect impurities in recombinant human Growth Hormone (rhGH), Interferon-alpha-2b (IFN) and Granulocyte colony-stimulating factor (G-CSF). In the test, fluorescently labeled Sandoz target proteins were spiked with the proteins as artificial impurities: BSA (66 kDa) and Ovalbumin (45 kDa) were chosen to simulate target proteins' aggregation (trimer and dimer); α-Lactalbumin (14.3 kDa) and insulin B (3.5 kDa) were chosen to simulate protein fragments. The impurities were spiked at concentrations from 1 µg/mL to 20 µg/mL. We confirmed that the biomolecular sorter could resolve all the impurities though the low-molecular weight impurities (14.3 kDa and 3.5 kDa proteins) were not fully resolved. The biomolecular sorter detection limit is currently 1 µg/mL (equivalent to <1% impurity detection in the case of 100 µg/ml product concentration). Additionally, it was observed that the peak-area of each impurity in the fluorescence signal profile is linearly proportional to its concentration.

Biologics Quality Test (Size-Based Homogenous Assay)

Figure 13:
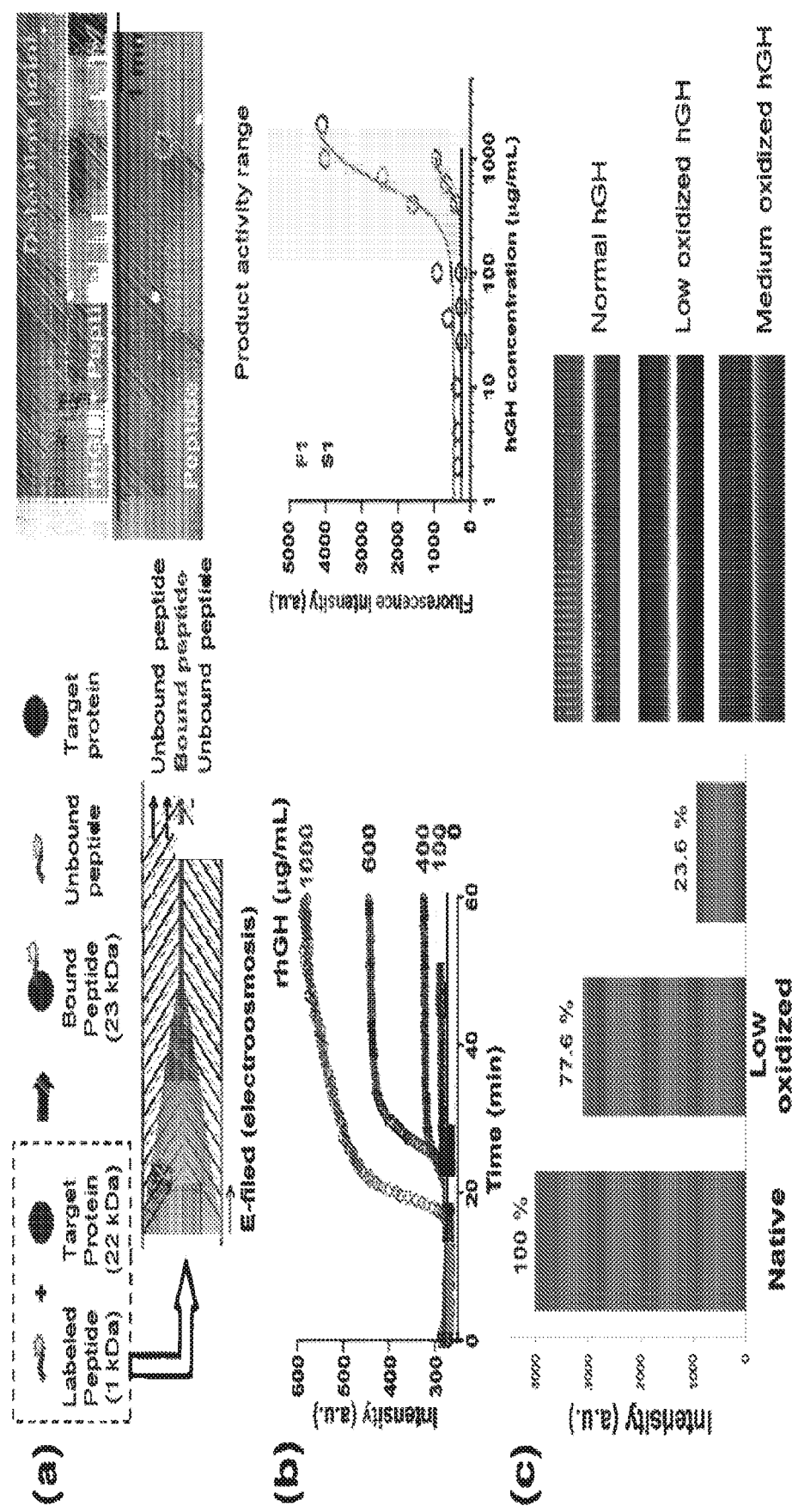
FIG. 13 Demonstration of homogeneous assay for quality test of rhGH. (a) Schematics of peptide assay principle in herringbone structure biomolecular sorter. Deep and shallow region depth are 100 nm and 30 nm, respectively; (b) Time-dependent binding profile (S1 peptide) and binding curve after 60 min assay (S1 and F1 peptides); (c) Detection of degraded protein (oxidized proteins), and each protein concentration is 1 mg/mL.

In addition to biologics purity testing, the proposed nanofluidic biomolecular sorter can be used to measure protein quality as well. The biomolecular sorter consists of periodically-patterned deep (100 nm) and shallow (30 nm) nanochannel meeting at right angles like herringbone structure, and the fabrication process is same with size separation biomolecular sorter. The nanofilter arrays with herringbone structure and labeled S1 and F1 peptides were used for rhGH quality test. FIG. 13(a) shows the principle of the homogenous peptide assay. Peptide is very small (~1 kDa), so that unbound peptides (small size) pass through nanofilter arrays without any significant deflection induced by interaction between molecules and channel wall. But, bound peptides with rhGH (large size) are deflected and accumulated in center region of the biomolecular sorter due to enough size to interact with wall. Fluorescence signal accumulated in the center region is observed to quantify the binding. As quantitative analysis, fluorescence intensity was measured over time, and with different hGH concentration to obtain reaction kinetics and binding curve, as show in FIG. 13(b). Since the sample can be loaded into the biomolecular sorter right after preparing mixture of protein and peptide, the homogeneous assay doesn't require additional incubation outside chip. From time-dependent binding profile (S1) and the binding curve (S1 and F1), it was observed that the detection limit of each peptide is 25 µg/mL (S1) and 2 µg/mL (F1), respectively. In addition, we tested applicability that the peptide can detect protein degradation or not. The F1 peptide and oxidized rhGH were used as a sensor molecule and a representative of degraded protein, respectively. In order to compare the extent of peptide binding to oxidized rhGH, a native rhGH (as reference) and two differently oxidized rhGHs (low oxidation and medium oxidation) were used. If it is assumed that degree of the native rhGH binding to peptide is 100%, the relative efficiency of two oxidized proteins is 77.6% (low oxidized rhGH) and 23.6% (medium oxidized rhGH), as shown in FIG. 13(c). Different species of peptides, such as IFN and G-CSF, can be similarly separated.

The biosensor can perform multiple orthogonal analyses in a single biomolecular sorter platform, and the detection sensitivity matches or exceeds current tools used in the industry. Additionally, the biosensor is applicable to point-of-care real time monitoring system (on-line product quality) in small-scale on-demand biomanufacturing system.

A preferred method of sorting a fluid mixture comprising a plurality of proteins or other biomolecules which vary in terms of the physio-chemical characteristics of each of said plurality of proteins or other biomolecules comprises the steps of:
  a) loading a fluid mixture comprising a plurality of proteins or other biomolecules in a biomolecular sorter described herein;
  b) applying a force field (e.g., an electrostatic force field or hydrodynamic force field) across the biomolecular sorter, e.g., via an at least a first conduit and the at least a second conduit, whereby applying said force field allows for preconcentration of the biomolecules of said sample or fluid mixture within the at least a first preconcentration region, and separation of like proteins or other biomolecules within the at least a first separation region; and
  c) collecting biomolecules or analyzing the separated biomolecules, e.g. via spectral or other optical imaging through the optical glass over the at least a first separation region.

The method can separate complex mixtures of molecules and/or biomolecules and is particularly well suited for size-based sorting. The biomolecules can sort nucleic acids, such as DNA, RNA, oligonucleotides, proteins, peptides, hormones, enzymes, ligands, sugars, carbohydrates, lipids, salts, polymers, oligomers, and other molecules. The sample to be sorted can be a native sample, such as a blood sample or urine sample, and is typically cell free. The sample can also be taken from a manufacturing process, such as a sample from a reactor, bioreactor, or purification process. In embodiments, the sample is buffered. Thus, the biosorter can be used to test for the presence of a molecule (e.g., in a mammalian sample) or as part of a quality control procedure.

REFERENCES

[1] J. Fu, R. B. Schoch, A. L. Stevens, S. R. Tannenbaum and J. Han, Nat. Nanotech., 2, 121~128 (2007).
[2] L. F. Cheow, H. Bow and J. Han, Lab Chip, 12, 444~14448 (2012).
[3] J. Fu, P. Mao and J. Han, Nat. Protocol, 4, 168~11698 (2009).
[4] H. Bow, J. Fu and J. Han, Electrophoresis, 29, 1~6 (2008).

While this invention has been particularly shown and described with references to preferred embodiments thereof, it will be understood by those skilled in the art that various changes in form and details may be made therein without departing from the scope of the invention encompassed by the appended claims.

What is claimed is:

1. A biomolecular sorter comprising:
a) a first substrate;
b) a second substrate affixed to a surface of the first substrate;
c) at least one sample inlet on the surface of the first substrate upstream from a first preconcentration region;
d) at least one sample outlet on the surface of the first substrate downstream from a first separation region;
e) the first preconcentration region comprising a plurality of first nanochannels having a shallow depth and a plurality of second nanochannels having a deep depth, and said plurality of first and plurality of second nanochannels are in fluid communication with each other and the at least one sample inlet;
f) the first separation region comprising a plurality of first nanochannels having a shallow depth and a plurality of second nanochannels having a deep depth, and said plurality of first and plurality of second nanochannels are in serial fluid communication with each other, downstream from the first preconcentration region and upstream from the at least one sample outlet;
g) a first conduit for applying an electrostatic force field or hydrodynamic force field to the nanochannels of the first preconcentration region and the nanochannels of the first separation region;
h) a second conduit for applying the electrostatic force field or hydrodynamic force field to the nanochannels of the first separation region and the nanochannels of the first preconcentration region;
wherein the depths of said nanochannels of the first preconcentration region and the nanochannels of the first separation region are between about 2 nm and 10 μm, and said nanochannels of the first preconcentration region are linear and are angled at between about 115 degrees and 155 degrees relative to the electrostatic or hydrodynamic force field so as to cause concentration of specific molecule species within the first preconcentration region, and said nanochannels of the first separation region are linear and are angled at between about 15 degrees and 75 degrees, relative to the electrostatic or hydrodynamic force field so as to cause separation of specific molecule species within the first separation region, and an unbroken plane exists between the surface of the first substrate and a surface of the second substrate such that the unbroken plane is in fluid communication with the nanochannels of the first preconcentration region and the nanochannels of the first separation region.

2. The biomolecular sorter of claim 1, wherein the at least one sample inlet is a reservoir.

3. The biomolecular sorter of claim 1, wherein the at least one sample outlet is a reservoir.

4. The biomolecular sorter of claim 1, comprising microfluidic channels in fluid communication with said nanochannels of the first preconcentration region.

5. The biomolecular sorter of claim 4, wherein said microfluidic channels comprise sample loading ports.

6. The biomolecular sorter of claim 1, comprising microfluidic channels in fluid communication with said nanochannels of the first separation region.

7. The biomolecular sorter of claim 6, wherein said microfluidic channels comprise sample collection ports.

8. The biomolecular sorter of claim 1, wherein said electrostatic force field or hydrodynamic force field is pulsed.

9. The biomolecular sorter of claim 1, wherein said electrostatic force field or hydrodynamic force field is continuous.

10. The biomolecular sorter of claim 1, wherein said second substrate comprises silicon or glass.

11. A microchip comprising the biomolecular sorter of claim 1.

12. A microchip comprising at least a first biomolecular sorter of claim 1 and at least a second biomolecular sorter of claim 1 wherein any one or more of: the widths of the nanochannels, the depths of the nanochannels, a pattern period, or angles of the nanochannels vary between the at least a first biomolecular sorter and the at least a second biomolecular sorter.

13. A method of sorting a fluid mixture comprising a plurality of proteins or other biomolecules which vary in terms of the physio-chemical characteristics of each of said plurality of proteins or other biomolecules, said method comprising the steps of:
a) loading the fluid mixture comprising the plurality of proteins or other biomolecules in a biomolecular sorter of claim 1;
b) applying an electrostatic force field or hydrodynamic force field to the first conduit and the second conduit, whereby applying said force fields allows for preconcentration of the plurality of proteins or other biomolecules of said fluid mixture within the first preconcentration region, and separation of like proteins or other biomolecules within the first separation region; and
c) collecting said biomolecules and/or performing spectral or other optical imaging on the separated proteins or other biomolecules via optical glass over the first separation region.

14. The method of claim 13, wherein said sorting is size-based.

15. The method of claim 13, wherein said electrostatic force field or hydrodynamic force field is applied in pulse-field operation mode.

16. The method of claim 13, wherein said electrostatic force field or hydrodynamic force field is applied in continuous-field operation mode.

17. The method of claim 13, wherein said fluid mixture comprises deoxyribonucleic acids (DNA), proteins, or a combination thereof.

18. The method of claim 13, wherein said fluid mixture comprises a buffered solution.

* * * * *